(12) United States Patent
Bell et al.

(10) Patent No.: US 6,370,265 B1
(45) Date of Patent: Apr. 9, 2002

(54) METHOD FOR GENERATING GRAY SCALE TRANSFER FUNCTIONS FOR USE IN DISPLAYING A DIGITAL RADIOGRAM

(75) Inventors: Jeffrey H. Bell, Wilmington, DE (US); Eric L. Gingold, Bala Cynwyd, PA (US)

(73) Assignee: Direct Radiography Corp., Newark, DE (US)

(*) Notice: Subject to any disclaimer, the term of this patent is extended or adjusted under 35 U.S.C. 154(b) by 0 days.

(21) Appl. No.: 09/449,075

(22) Filed: Nov. 24, 1999

(51) Int. Cl.$^7$ ................................................. G06K 9/00
(52) U.S. Cl. ........................ 382/132; 382/274; 345/155
(58) Field of Search ................................. 382/132, 274; 358/461; 345/20, 63, 77, 147

(56) References Cited

U.S. PATENT DOCUMENTS

| | | | |
|---|---|---|---|
| 4,602,291 A | | 7/1986 | Temes ........................ 358/221 |
| 4,641,267 A | | 2/1987 | Asai et al. ................... 364/414 |
| 5,091,864 A | * | 2/1992 | Baji et al. ..................... 706/42 |
| 5,164,993 A | | 11/1992 | Capozzi et al. ................ 382/6 |
| 5,220,398 A | * | 6/1993 | Horn et al. .................. 356/152 |
| 5,274,716 A | * | 12/1993 | Mitsuoka et al. ........... 382/210 |
| 5,313,066 A | | 5/1994 | Lee et al. ............... 250/370.09 |
| 5,315,101 A | | 5/1994 | Hughes et al. ........... 250/208.1 |
| 5,506,797 A | * | 4/1996 | Koshiba ..................... 708/272 |
| 5,588,435 A | * | 12/1996 | Weng et al. ................ 128/660 |
| 5,633,511 A | | 5/1997 | Lee et al. .................... 250/587 |
| 5,662,113 A | * | 9/1997 | Liu ............................. 128/660 |
| 5,946,407 A | | 8/1999 | Bamberger et al. ......... 382/132 |

FOREIGN PATENT DOCUMENTS

JP          8-36644       *  2/1996   ............. G06T/7/00

* cited by examiner

Primary Examiner—Leo Boudreau
Assistant Examiner—M. Choobin
(74) Attorney, Agent, or Firm—Ratner & Prestia

(57) ABSTRACT

A method for generating on demand a gray scale transfer curve for use in displaying an image comprised of a plurality of digital values representing pixel gray scale levels with a desired contrast and brightness. This is achieved by using a single sigmoid shaped function $Y=f(X, a, b, c)$ resembling an H&D curve of a photographic film. The Y axis represents digital output values to be used in displaying an image, while the X axis represents input digital values representing captured image information. "a" is a number representing boundary conditions for X and Y, "b" is a first parameter controlling the location of the curve along the X axis and "c" is a second parameter controlling the slope of the curve slope. This function is used to derive a Look-Up-Table (LUT) representing a continuous GST curve having the desired contrast and brightness.

10 Claims, 3 Drawing Sheets

METHOD FOR GENERATING GRAY SCALE TRANSFER FUNCTIONS FOR USE IN DISPLAYING A DIGITAL RADIOGRAM

FIELD OF THE INVENTION

This invention relates to a method for displaying a radiographic image composed of a plurality of digital values, and more particularly to a method for generating a look up table (LUT) representing a desired gray scale transfer (GST) function for displaying a visually enhanced radiogram.

BACKGROUND OF THE INVENTION

There exists significant activity in the development of digital x-ray image data capture systems. In such systems direct conversion to an electrical signal of the incident radiation is obtained using a plurality of sensors (also known as pixels) in an array. The sensor output is almost invariably immediately converted to a digital signal by an analog-to-digital converter as known in the art and further processed and stored in a databank for use in the eventual display of the data as a radiograph. U.S. Pat. No. 5,313,066 issued to Lee et al. (hereinafter the '063 patent) and U.S. Pat. No. 5,315,101 issued to Hughes et al. describe typical such sensor arrays and their contents are incorporated herein by reference. Even though several different technologies are being utilized, the output data are quite similar.

A major advantage of digital data detection systems is the wide dynamic range of signal capture. Display media, such as radiographic film or cathode ray tube (CRT) displays, on the other hand, have a substantially more limited dynamic range. A typical digital x-ray capture system can have a useful dynamic detection range of greater than a 1,000:1. However, the typical currently available display media are generally limited to a dynamic range of less than 100:1. There is, therefore, need to determine and select the optimal limited range of useful data for diagnostic display, and then properly display such range on the available display medium.

This problem, which reduces to a need for a method whereby the exposure sensor output is mapped onto the display transfer function of the display device, has been addressed by the art in numerous ways. Typically the sensor output is digitized, and a histogram of the frequency of occurrence of digital values representing detected exposure is constructed. Histogram analysis is often used to determine the relevant portions of the data, that is data carrying significant diagnostic information, and the digital values in this range are mapped onto the display transfer function, usually using a look-up table (LUT), as is well known in the art. These steps are rather fundamental and are well known to the person skilled in this art. What is significant and the subject of continuing research is the manner in which the digital values are processed and mapped to display the maximum amount of relevant information within the limitations of the available display media. This in turn requires the generation of the transfer function to create an optimal radiograph wherein the features of interest are distinguishable from background features and wherein maximum visual contrast is applied to the region of interest.

The method most often used in actual practice for mapping the data derived from the detector, is to store a plurality of GST curves representing empirically derived GST shapes in the form of LUTs in a memory, and to select one of the stored GSTs to reproduce a given image. If the desired region of interest in the reproduction proves too dark, or has insufficient contrast, another GST curve is chosen and the output observed again and so on, until an acceptable image is produced. Such method, however, is limited by the number of curves stored, and does not allow for continuous changing of the contrast and brightness of the displayed image.

U.S. Pat. No. 4,641,267 issued Feb. 3, 1987 to Asai et al. shows an early attempt to overcome some of the above limitations. Asai begins by generating first a set of reference tone correction curves. In displaying an image, Asai selects one of the reference curves and a point $Y(x_0)$ on the curve corresponding to a desired point on the Y (output value) axis. By rotating the curve around this point Asai can change the contrast of the output image.

U.S. Pat. No. 5,946,407 issued Aug. 31, 1999 to Bamberger et al. is an improvement on the method taught by Asai and is believed to represent the current state in developing GSTs. Bamberger teaches creating the GST as a combination of two curves, by using two algorithms to describe two distinct portions of a GST. The point where the two curves connect is set at the 50% of the Y (output value) axis. The slope of the two curves around the connecting point determines the contrast of the displayed image in the area of most interest, while moving the connecting point along the X (input value) changes the brightness (or film density if the display medium is film) of the areas of interest. The term brightness as used hereinafter is to be considered as referring to the gray scale gradations of an image in general, and to include optical density when the display medium is hard copy.

While this method provides good results, it is computationally intensive. Furthermore, in certain applications it is desirable to calculate the point of maximum slope of the GST (maximum contrast) which is usually done by obtaining the second derivative of the curve. The discontinuity due to the use of two algorithms to form the GST introduces complications in this calculation. It is desirable, therefore to have a method for quickly developing accurate GSTs on demand, given certain input parameters representing desirable contrast and brightness characteristics with optimum visual appearance similar to the visual appearance obtained as a result of the typical H&D response of photographic materials used in capturing radiograms using the traditional method of exposing the photographic material to X-ray radiation.

SUMMARY OF THE INVENTION

It is an object of this invention to provide a method for generating on demand a gray scale transfer curve for use in displaying an image comprised of a plurality of digital values representing pixel gray scale levels with a desired contrast and brightness. This is achieved by using a single sigmoid shaped function $Y=f(X, a, b, c)$ wherein the function resembles an H&D curve of a photographic film. The Y axis represents digital output values to be used in displaying an image, while the X axis represents input digital values representing captured image information.

"a" is a number representing boundary conditions for X and Y, "b" is a first parameter controlling the location of the curve along the X axis and "c" is a second parameter controlling the slope of the curve slope. This function is used to derive a Look-Up-Table (LUT) representing a continuous GST curve having the desired contrast and brightness.

The above described method permits the derivation of families of GST curves and corresponding LUTs representing different contrasts and brightness, by varying the values of the parameters "b" and "c".

Particularly useful is the function $Y=a/(1+b*e^{-cX})$. Parameter "c" is dependent on the maximum input digital value possible. Experience has shown that in a system where the input values have been normalized and range between 0 and 100, good results are obtained with values for "c" selected between 0.02% and 0.2% of the maximum scale value for X, and preferably between 0.06% and 0.10%. Parameter "b" is given by:

$$X_{max\ contrast} * c = \ln b$$

and the value of "a" may be calculated by solving the above given function for "a" using:

$$a = Y_u * (1 + b * e^{-cX_u}).$$

The input digital values for the X and Y axis may be normalized preferably between 0–100, in which case "a" is derived for $Y_u=100$ and $X_u=100$.

DETAIL DESCRIPTION OF THE INVENTION

The invention will next be described with reference to the figures, wherein similar number indicate similar parts in all figures.

Figure 1:
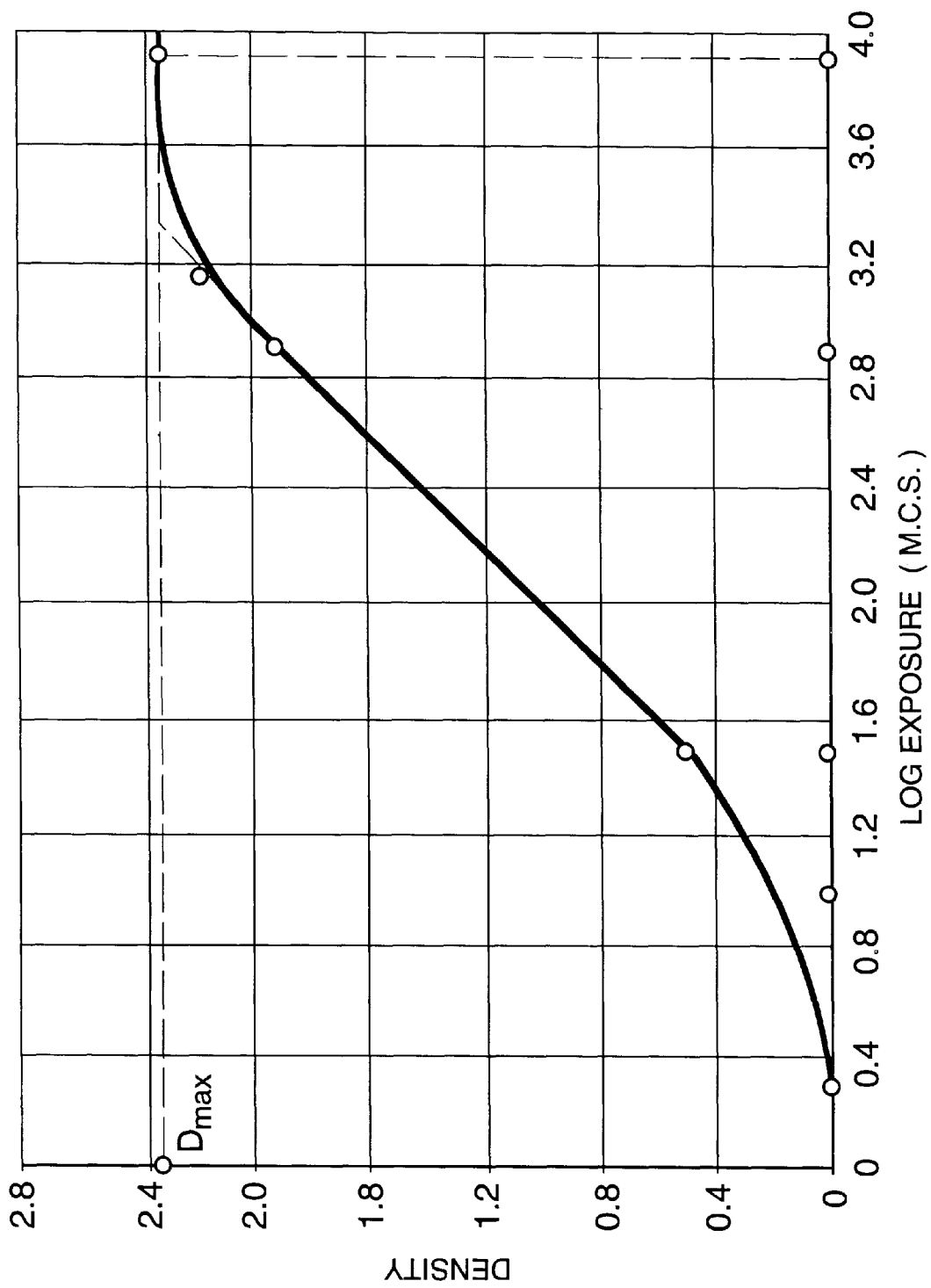
FIG. 1 shows a typical H&D curve for a screen-film combination used in traditional radiography.

FIG. 1 shows two typical H&D curves for two hypothetical photographic films used in capturing X-ray radiation. What these curves show are the exposed and developed film density as a result of radiation exposure. The Y axis represents the film density and the X axis the logarithm of the exposure. Exposure is the product of the incident radiation intensity times the duration of incidence of the radiation onto the film. The exposure may be the result of irradiating the film with x-rays only or it may be the result of exposing the film through a film intensifying screen combination. Different films have different H&D curves. The slope of the curve at any point indicates the contrast characteristic of the particular film or film screen combination at a given exposure level. The shift of the curve to the right or left relative to the Y axis is related to the reproduced density, (or brightness) of portions of the exposed areas, and is, in photographic film, a function of the film screen system sensitivity.

The medical profession has been trained over the years to evaluate the results of radiographic examinations in the form of radiograms, that is films exposed to x-ray radiation, that display areas of different radiation absorption in accordance to the film's H&D curve. Photographic film happens to have a response wherein density as a function of the logarithm of exposure closely matches the eye's response and thus produces desirable visual appearance images.

Electronic image capture is almost always a linear process of extremely wide range. As stated in the introduction above, in traditional radiography the exposure latitude is of the order of 100 to 1 or less, while in electronic radiography the exposure latitude is of the order of 1,000 to 1 or more, and has introduced a set of display problems unique to this field.

In an effort to display an electronic radiogram in such manner as to simulate the visual appearance of a traditional radiogram while controlling contrast and brightness it is essential to process the raw data captured by the electronic device and following digital conversion. Such processing typically includes: (a) determining the exposure range and image densities that carry significant information for diagnostic purposes, (b) compressing the extensive data obtained from the detector usually from 14 bits to 12 or 8 bits and (c) mapping the data through an input-output transformation so that the output data used in displaying the image will display an image of desirable visual characteristics with optimum contrast at optimum brightness, or when the display medium is hard copy such as film, density.

The determination of the data values representing a significant brightness or density range, and the compression of the data values are separate subjects not directly related to understanding the present invention. For the present invention purposes the imaging data values have already undergone such processing and have been reduced to the input data values that will be displayed, typically 12 bits representing image values from 0 to 4095 (4096 digital values), or 8 bits representing image-values varying from 0 to 255 (256 digital values). U.S. Pat. No. 5,633,511 and U.S. Pat. No. 5,946,407 are two reference among others, that disclose methods for performing steps (a) and (b).

Once the data has reached the stage where it is available in format for display as a plurality of digital values, it is next mapped onto a gray scale transfer (GST) curve through the use of a look up table (LUT), and the new values are sent to a display device for image display. The digital values prior to processing through the LUT are referred to hereinafter as the input digital values while the values resulting from the LUT operation on the input values are referred to as the output digital values. The digital output values are used to drive a display device which can be a CRT monitor in which case the output values represent brightness levels of the displayed image on the monitor, or the display device may be a hard copy output device with the output being a photosensitive material, in which case the output values represent optical density (gray scale) of the output image. Typically a higher output value represents a darker image in CRT displays and a higher density image (darker) image in hard copy display.

The present invention proposes the use of a single algorithm to simulate the generally "S" shaped H&D curve of the typical film screen combination, and use this algorithm to construct GST curves having different contrast and brightness characteristics. While there are a number of possible algorithms that produce a generally "S" shaped curve, it has been found that a function $Y=f(a, b, c, X)$ where "a" has a value dependent on selected boundary conditions, and where "b" and "c" are parameters that control the slope and relative position along the X-axis of the curve represented by the function can be used to quickly derive any one of an almost infinite number of "S" type curves representing different displayed image contrast and brightness, or density. The ability to vary the curves is provided by the two parameters "b" and "c", which may be varied within predetermined limits to provide families of "S" type curves that generate images exhibiting different contrast characteristics and/or brightness (or density).

More particularly according to a preferred embodiment of this invention the following algorithm satisfies the above requirements:

$$Y=a/(1+b*e^{-cX}),\quad(1)$$

The slope of this curve, represents the contrast of an image produced using the output values obtained from input values. Selecting the point of maximum contrast along the X axis defines "b" and is given by:

$$X_{max\ contrast}=\ln(b)/c\quad(2)$$

Two parameters, (c) and (b), control the slope and location of maximum slope along the X-axis of the resulting GST curve generated using equation (1). Once parameter "c" is selected, parameter "b" may be calculated using equation (2).

Parameter "c" is related to the scaling of the X-axis, and the maximum possible digital value, i.e. maximum scale value, of the input digital values on the X-axis, $X_{max\ value}$. "c" has been found by experience to be preferably between 0.01% and 0.2% of $X_{max\ value}$. When the input digital values are normalized, that is the X axis value range is between 0 and 100, preferred values for "c" are between 0.01 and 0.20 with the most preferred range being between 0.06 and 0.1. Where the X-axis values are from 0–255, "c" values range, i.e. 0.05 to 0.5, and so on. Values outside these ranges may be also be used, however experience has shown that most applications will obtain optimum visual results using values within the given range.

Depending on where the maximum contrast point is placed on the X axis, a different value for parameter "b" is obtained. Once parameters "c" and "b" have been obtained, "a" is derived by solving equation (1) for desired boundary conditions. From (1) we obtain:

$$a=Y_u(1+b*e^{-cX_u}).\quad(3)$$

The boundary conditions depend on the digital input and output value range. $X_u$ and $Y_u$ are the X and Y values representing the upper limits of possible input and output digital values. In an 8 bit system the input and output boundary conditions for $X_u$ and $Y_u$ are 255 and 255. Preferably both the input and output values are normalized digital values ranging from 0–100, in which case $X_u$ and $Y_u$ are equal to 100. In such case, $$a=100(1+b*e^{-100c}).$$

Figure 2:
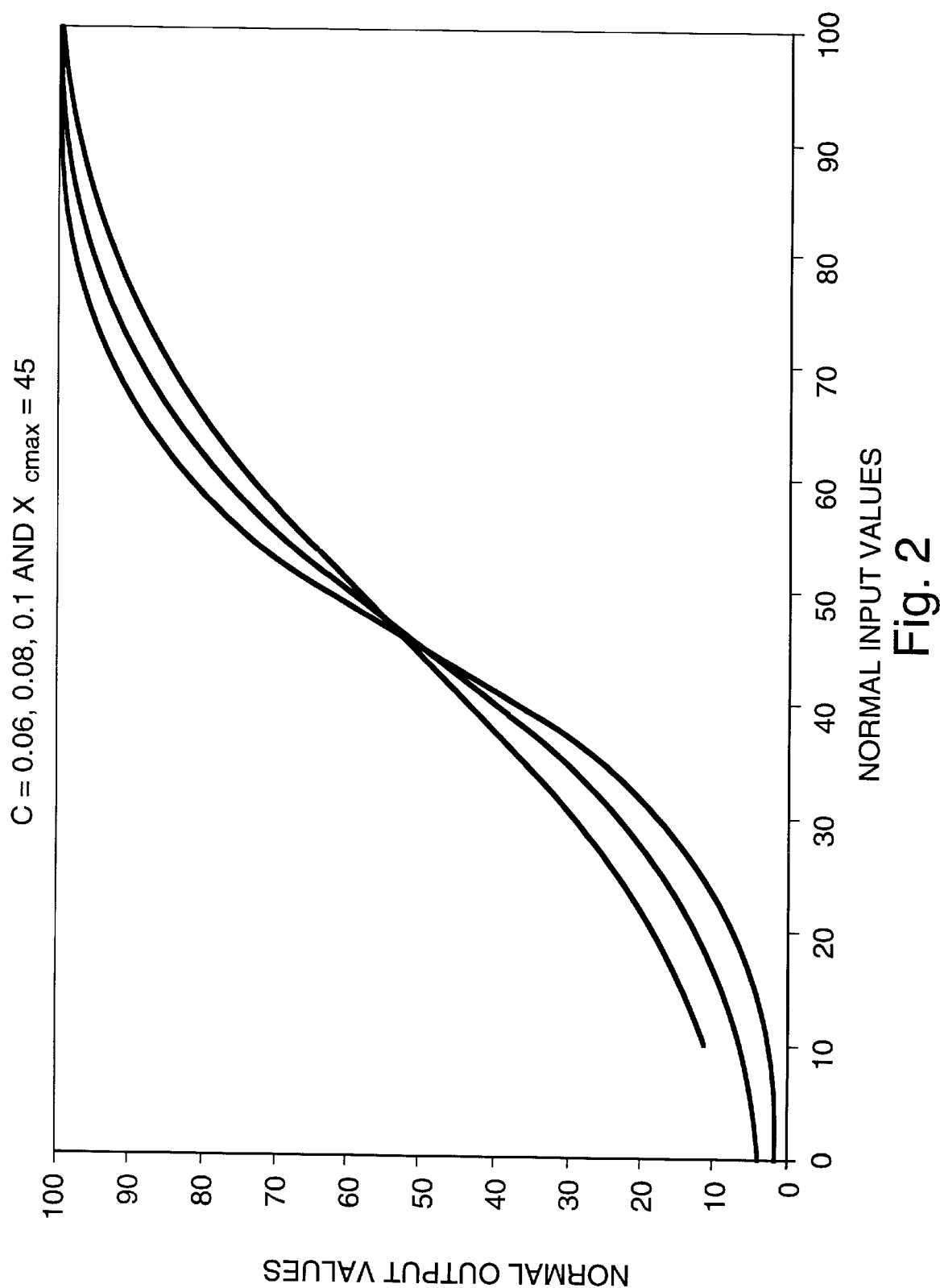
FIG. 2 shows a family of GST curves obtained through the process of this invention illustrating the change of contrast as a function of parameter "c".
Figure 3:
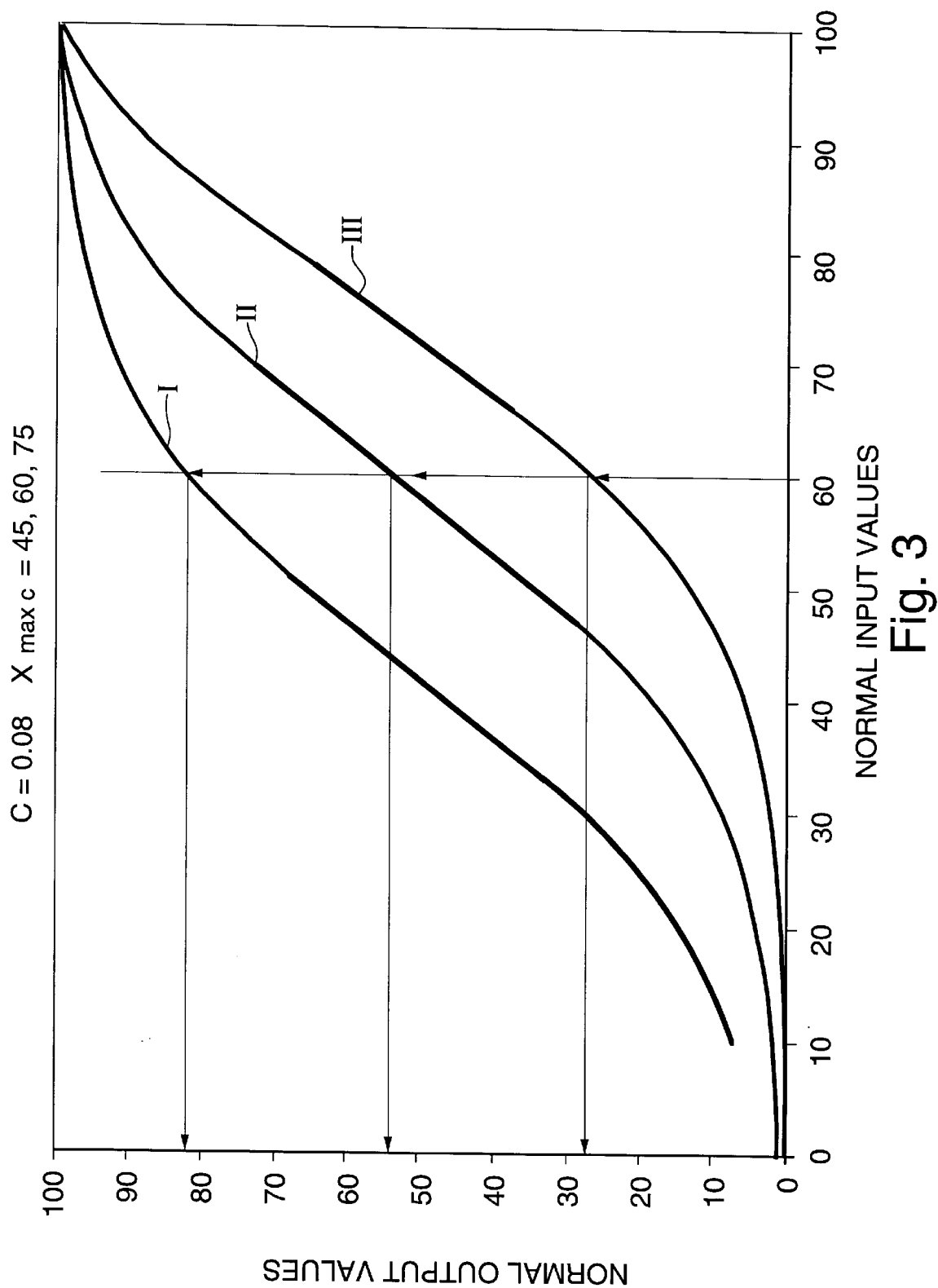
FIG. 3 shows a family of GST curves obtained through the process of this invention illustrating the change in output values and thus brightness levels (or film density if the display medium is film) for a given region of input values as a function of parameter "b".

FIG. 2 shows a family of GTS curves obtained using equation (1) with parameter "c" varied between c=0.06, 0.08, and 0.10. In all cases $X_{max\ contrast}=45$. As is seen from the figure the slope of the curve changes resulting in more contrast in the displayed image, increasing as "c" increases. FIG. 3 on the other hand shows another family of curves where the parameter "c" controlling contrast is held constant while parameter "b" has been changed. In this case the point of maximum contrast has been shifted progressively to the right along the X-axis, $X_{max\ contrast}$ being 45, 60 and 75 respectively. Equation (2) yields the following values for "b": 28.79, 121.51 and 403.

The result of this curve shift is a change in the output value for a given input value. For example a digital value of 60 will result in an output value of 28, 54 and 82 respectively. A value of 28 will be represented as much brighter than one of 82 in the final image. Depending on the particular portion of the data one wants to emphasize any one of these curves may provide better visual results. For instance if the information sought to be observed is in the range of between 60 and 80 input digital normalized values, then curve III is probably the best suited to display the information since this data range is displayed over a range of 30 to 80 output normalized values. On the other hand if the desired input range is between 30 and 60 in the input axis, curve I is best.

The equations are typically used as follows. Following capture of a radiogram and conversion to a digital set of values, the raw data is processed to compensate for individual pixel gain lack of uniformity and to replace dead or bad pixels. This is well known technology and needs no further discussion. See for example currently pending patent application Ser. No. 09/255,772 filed Feb. 23, 1999 by Chuande Liu and assigned to the assignee of the present invention, as well as U.S. Pat. No. 4,602,291 issued to Temes on Jul. 22, 1986 and U.S. Pat. No. 5,164,993 issued to Capozzi et al. on Nov. 17, 1992 as examples of the technology used for this purpose.

Again typically the data after this processing stage is compressed from 14 bits to 12 bits and may undergo further processing as described in co-pending application filed contemporaneously herewith in the name of Gregory Powell and assigned to the assignee of the present application, or as described in the aforementioned U.S. Pat. No. 5,633,511 issued to Lee et al.

Following this and any other processing the image data is now ready for display. At this time, before the data is forwarded to the display device, it is mapped onto a GST curve. This curve is generated on demand, based on default values for the parameters "c", "b" and "a". The point of maximum contrast for use as Xmax contrast, usually varies between 30 and 80 and is preferably about 45.

Default parameters have been developed based on experimental results for different types of radiograms, i.e. chest lateral, chest frontal, GI, bone fractures etc. Typical values for parameters were given above in this description. The default parameters provide a beginning point from which one may, after observing the displayed image, select parameters and modify the GST to produce a visual appearance best suited to the particular examination needs. For example, if the image appears generally flat, parameter "c" may be increased to provide better contrast. Similarly if a particular region of special interest in the image appears dark, $X_{max\ contrast}$ and parameter "b" can be altered to shift the GST to the left or to the right changing the brightness of that region.

The GST may be applied to the input values on the fly, so to speak, by calculating output (Y) values for each input (X) value of the digital image, or a LUT table may be created prior to displaying the image and stored in memory for later use during the image display. In either case there is never a need to store a large number of LUTs representing different GSTs in the system, and to attempt to optimize the visual appearance of the displayed radiogram by selecting one of the stored GSTs. This invention provides an infinite number of GSTs any one of which can be rapidly generated and tailored to produce an image with proper contrast, brightness (or density), and generally a visual appearance that simulates accurately the appearance of similar radiograms obtained through traditional radiography using a film screen combination.

The invention is best implemented through a computer programmed to derive the GST curve and/or a corresponding LUT representing the function Y=f(X, a, b, c). Such program may be embodied in a computer readable medium such as magnetic tape or disc, or in a CD or any other medium usable for programming a computer. Programming a computer to solve for values of Y given a function such as equation 1 is well known in the art. Such program will be structured to accept input values for "c" and $X_{max\ contrast}$ from a keyboard or other input device, or may retrieve such values from a stored data base containing preselected values for "c" and $X_{max\ contrast}$ for different types of radiograms. The program will next calculate "b" and "a" by solving equations (2) and (3). Values for $Y_u$ and $X_u$ may be input either by the operator or, preferably be stored in memory in the computer as part of an initialization process.

Once the two equations have been solved and the values of "a", "b" and "c" obtained, the program will use these parameter values to solve equation (1) for each input value. This may be done by providing the program with the ability to receive input values and calculate an output value each time an input value is received, or to pre-calculate all output values for the full range of input, X axis, values and form a LUT which is stored in a memory and used to supply output values for each input value received.

Such program may be a stand alone program, or, preferably, may be part of a larger program used to process the data received from a radiation detector and to supply such data for display to a display medium.

Those skilled in the art having the benefit of the above description can make numerous modifications particularly as to the actual numerical values used in the examples given above. Any such modifications are to be construed as encompassed within the scope of the invention as claimed herein below.

What is claimed is:

1. A method for generating on demand a gray scale transfer (GST) curve for use in deriving a Look-Up-Table (LUT) for displaying an image comprised of a plurality of digital values representing pixel densities with a desired contrast and brightness, the method comprising using a single sigmoid function Y=f(X, a, b, c) wherein Y represents output values used in displaying an image, X represents input digital values representing captured image information, b=inv ln ($X_{max\ contrast}$*c) and is a first parameter controlling the location of the curve along the X axis, "c" is between 0.01% to 0.2% of $X_{max\ value}$ and is a second parameter controlling the curve slope and a=$Y_u$*(1+b*e$^{-cX_u}$) and wherein $X_u$ and $Y_u$ represent input and output digital data boundary conditions.

2. A method for generating on demand a gray scale transfer (GST) curve for use in deriving a Look-Up-Table (LUT) for displaying an image comprised of a plurality of digital values representing pixel densities with a desired contrast and brightness, the method comprising using a single sigmoid function Y=f(X, a, b, c) wherein Y represents output values used in displaying an image, X represents input digital values representing captured image information, "b" is a first parameter controlling the location of the curve along the X axis, "c" is a second parameter controlling the curve slope and "a" is determined from boundary conditions wherein the function Y=f(X, a, b, c) is:

$$Y=a/(1+b*e^{-cX})$$

where b=inv ln ($X_{max\ contrast}$*c); "c" is between 0.01% to 0.2% of $X_{max\ value}$ and:

$$a=Y_u*(1+b*e^{-cX_u}).$$

3. The method according to claim 1 wherein the parameters "b" and "c" are varied to produce a family of LUTs representing a family of GST curves having desired different contrast and brightness.

4. The method according to claim 2 wherein the input digital values for the X axis are normalized input digital values.

5. The method according to claim 4 wherein the output digital values from the Y axis are also normalized output digital values.

6. A program embodied in a machine readable medium for programming a control computer to generate on demand a gray scale transfer (GST) curve for use in deriving a Look-Up-Table (LUT) for displaying an image comprised of a plurality of digital values representing pixel densities with a desired contrast and brightness, using a single sigmoid function Y=f(X, a, b, c) wherein Y represents output values used in displaying an image, X represents input digital values representing captured image information, b=inv ln ($X_{max\ contrast}$*c) and is a first parameter controlling the location of the curve along the X axis, "c" is between 0.01% to 0.2% of $X_{max\ value}$ and is a second parameter controlling the curve slope and a=$Y_u$*(1+b*e$^{-cX_u}$) and wherein $X_u$ and $Y_u$ represent input and output digital data boundary conditions.

7. A program embodied in a machine readable medium for programming a control computer to generate on demand a gray scale transfer (GST) curve for use in deriving a Look-Up-Table (LUT) for displaying an image comprised of a plurality of digital values representing pixel densities with a desired contrast and brightness, using a single sigmoid function Y=f(X, a, b, c) wherein Y represents output values used in displaying an image, X represents input digital values representing captured image information, "b" is a first parameter controlling the location of the curve along the X axis, "c" is a second parameter controlling the curve slope and "a" is a number representing boundary conditions, wherein the function Y=f(X, a, b, c) is:

$$Y=a/(1+b*e^{-cX})$$

where b=inv ln ($X_{max\ contrast}$*c); "c" is between 0.01% to 0.2% of $X_{max\ value}$ and:

$$a=Y_u*(1+b*e^{-cX_u}).$$

8. The computer program according to claim 7 wherein the output values are digital output values representing a radiogram.

9. A method for displaying an image comprised of a plurality of digital values representing pixel densities with a desired contrast and brightness, the method comprising:

deriving a Look-Up-Table (LUT) by generating on demand a gray scale transfer (GST) curve using a single sigmoid function Y=a/(1+b*e$^{-cX}$), wherein Y represents output values used in displaying said image, X represents input digital values representing captured image information and wherein:
b=inv ln ($X_{max\ contrast}$*c) and is a first parameter controlling the location of the curve along the X axis, "c" is between 0.01% to 0.2% of $X_{max\ value}$ and is a second parameter controlling the curve slope and a=$Y_u$*(1+b*e$^{-cX_u}$) wherein $X_u$ and $Y_u$ represent input and output digital data boundary conditions;
and using the derived LUT to modify said plurality of input digital values prior to displaying said image.

10. A program embodied in a machine readable medium for programming a control computer to generate on demand a gray scale transfer (GST) curve for use in deriving a Look-Up-Table (LUT) for modifying a plurality of digital image values representing pixel densities with a first contrast and brightness to modified digital values having desired contrast and brightness, wherein said Look-Up-Table (LUT) is derived by generating on demand a gray scale transfer (GST) curve using a single sigmoid function $Y=a/(1+b*e^{-cx})$, and wherein Y represents output values used in displaying said image, X represents input digital values representing captured image information, $b=\text{inv ln}(X_{max\ contrast}*c)$ and is a first parameter controlling the location of the curve along the X axis, "c" is between 0.01% to 0.2% of $X_{max\ value}$ and is a second parameter controlling the curve slope, and $a=Y_u*(1+b*e^{-cX_u})$ wherein $X_u$ and $Y_u$ represent input and output digital image data boundary conditions;

and wherein the program further comprises modifying said plurality of input digital image values using said derived LUT and using said modified digital image values to display an image having a desired contrast and brightness.

* * * * *